US012645697B1

(12) United States Patent　　　　　(10) Patent No.: US 12,645,697 B1

Behera et al.　　　　　　　　　　　(45) Date of Patent: Jun. 2, 2026

(54) DATA REPLICATION FROM AN ALTERNATIVE SOURCE COMPUTING SYSTEM

(71) Applicant: Dell Products L.P., Round Rock, TX (US)

(72) Inventors: Narayan Behera, Pune (IN); Suhas Dattatray Mane, Pune (IN); Abhijit Toley, Pune (IN); Prakash R. Bhurke, Pune (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/009,806

(22) Filed: Jan. 3, 2025

(51) Int. Cl.
　　　*G06F 16/00*　　　(2019.01)
　　　*G06F 16/27*　　　(2019.01)

(52) U.S. Cl.
　　　CPC ................................... *G06F 16/27* (2019.01)

(58) Field of Classification Search
　　　CPC ....................................................... G06F 16/27
　　　See application file for complete search history.

(56) References Cited

U.S. PATENT DOCUMENTS

| | | | | |
|---|---|---|---|---|
| 10,394,485 | B1 * | 8/2019 | Chen | ....................... G06F 3/061 |
| 11,079,961 | B1 * | 8/2021 | Meiri | .................... G06F 3/0613 |
| 12,181,981 | B1 * | 12/2024 | Heidemeyer | ......... G06F 16/275 |
| 2004/0236803 | A1 * | 11/2004 | Spiegeleer | .......... G06F 11/1453 |

FOREIGN PATENT DOCUMENTS

| | | | | |
|---|---|---|---|---|
| CN | 118069612 A | * | 5/2024 | ......... H04L 67/1095 |
| EP | 3070620 A1 | * | 9/2016 | ......... G06F 16/2462 |

* cited by examiner

*Primary Examiner* — Alexander Khong

(74) *Attorney, Agent, or Firm* — Amin, Turocy & Watson, LLP

(57)　　　　　　　　ABSTRACT

A source computing system may transmit to a target computing system a replication request to replicate data. The replication request may comprise a checksum derived from a portion of the data to be replicated. The target system may use the checksum to obtain data from a local computing system corresponding to a matching checksum in a table corresponding to the local computing system. The target system may unicast a request to the local computing system based on a checksum associated with the local system in a master table matching the checksum received in the replication request. The target system may broadcast, to local computing systems, a request that comprises the checksum indicated in the replication request. The target system may construct the data to be replicated using data received from the local computing system(s), responsive to the unicast or broadcast, instead of replicating the data from the source computing system.

20 Claims, 13 Drawing Sheets

FILE CHUNK FIXED/VARIABLE/CONFIGURABLE

205A  CHUNK A

205B  CHUNK B

205C  CHUNK C

205n  CHUNK n

120

| File Path | Checksums of File Chunks in Order | File Size | Other Metadata |
|---|---|---|---|
| /ifs/data/src/dir1/file1 | Checksum1, Checksum2, Checksum3,Checksum4, Checksum5 | 640 | x |
| /ifs/data/src/dir2/file6 | Checksum6, Checksum1, Checksum3 | 320 | y |
| /ifs/data/src/dir3/file2 | Checksum8, Checksum10 | 260 | z |
| /ifs/data/src/file1 | Checksum3, Checksum12, Checksum10, Checksum4 | 540 | p |
| /ifs/data/src/dir4/file6 | Checksum1 | 140 | q |
| /ifs/data/src/dir3/dir4/file2 | Checksum1, Checksum20, Checksum30, Checksum45, Checksum90 | 700 | r |

| Checksum | File Path | Offset | Length | Other Metadata |
|---|---|---|---|---|
| Checksum1 | /src/data/smane/Dcuments/result.txt | 0 | 128 | a |
| Checksum3 | /src/data/smane/Backup/Jan_25_data.bak | 640 | 256 | b |
| Checksum4 | src/data/smane/patents/approved/efficient_replication.pdf | 128 | 5 | c |
| Checksum9 | /src/data/smane/Downloads/antivirun.gzip | 256 | 256 | d |
| Checksum20 | /src/data/smane/Images/screenshot_001.png | 384 | 128 | e |
| Checksum10 | /src/data/smane/Vdeos/Presententation_recording.mp4 | 1024 | 128 | f |

|   | Checksum | Server | File Path | Offset | Length | RTT |
|---|---|---|---|---|---|---|
| A | Checksum3 | Storage_Server_P | /smane/Dcuments/result.txt | 640 | 128 | 60 |
| B |  | *Storage_Server_N* | */nbehera/Videos/demo_recording.mp4* | *512* | *128* | *20* |
| C | Checksum4 | Storage_Server_Q | /nbehera/Backup/Jan_25_data.bak | 128 | 5 | 80 |
| D |  | *Storage_Server_R* | */smane/Images/screenshot_001.png* | *0* | *5* | *40* |
| E | Checksum5 | Storage_Server_Z | /atoley/patents/approved/efficient_replication.pdf | 256 | 256 | 20 |
| F | Checksum6 | Storage_Server_M | /pbhurke/Downloads/antivirun.gzip | 384 | 128 | 90 |
| G |  | *Storage_Server_Y* | */smane/Downloads/2020.mp4* | *256* | *128* | *10* |
| H | Checksum7 | Storage_Server_P | /smane/Images/screenshot_001.png | 896 | 128 | 60 |
| I | Checksum10 | Storage_Server_N | /nbehera/Videos/Presententation_recording.mp4 | 3200 | 256 | 20 |
| J |  | *Storage_Server_R* | */pbhurke/Dcuments/result.txt* | *512* | *128* | *40* |
| K | Checksum12 | Storage_Server_P | /atoley/Presentations/Dec_24_demo.mp4 | 0 | 128 | 60 |
| L | Checksum30 | Storage_Server_Q | /nbehera/Backup/Jan_25_data.bak | 0 | 128 | 15 |
| M | Checksum45 | Storage_Server_Y | /atoley/patents/approved/efficient_replication.pdf | 128 | 128 | 30 |
| N | Checksum95 | Storage_Server_R | /smane/Downloads/antivirun.gzip | 0 | 256 | 24 |

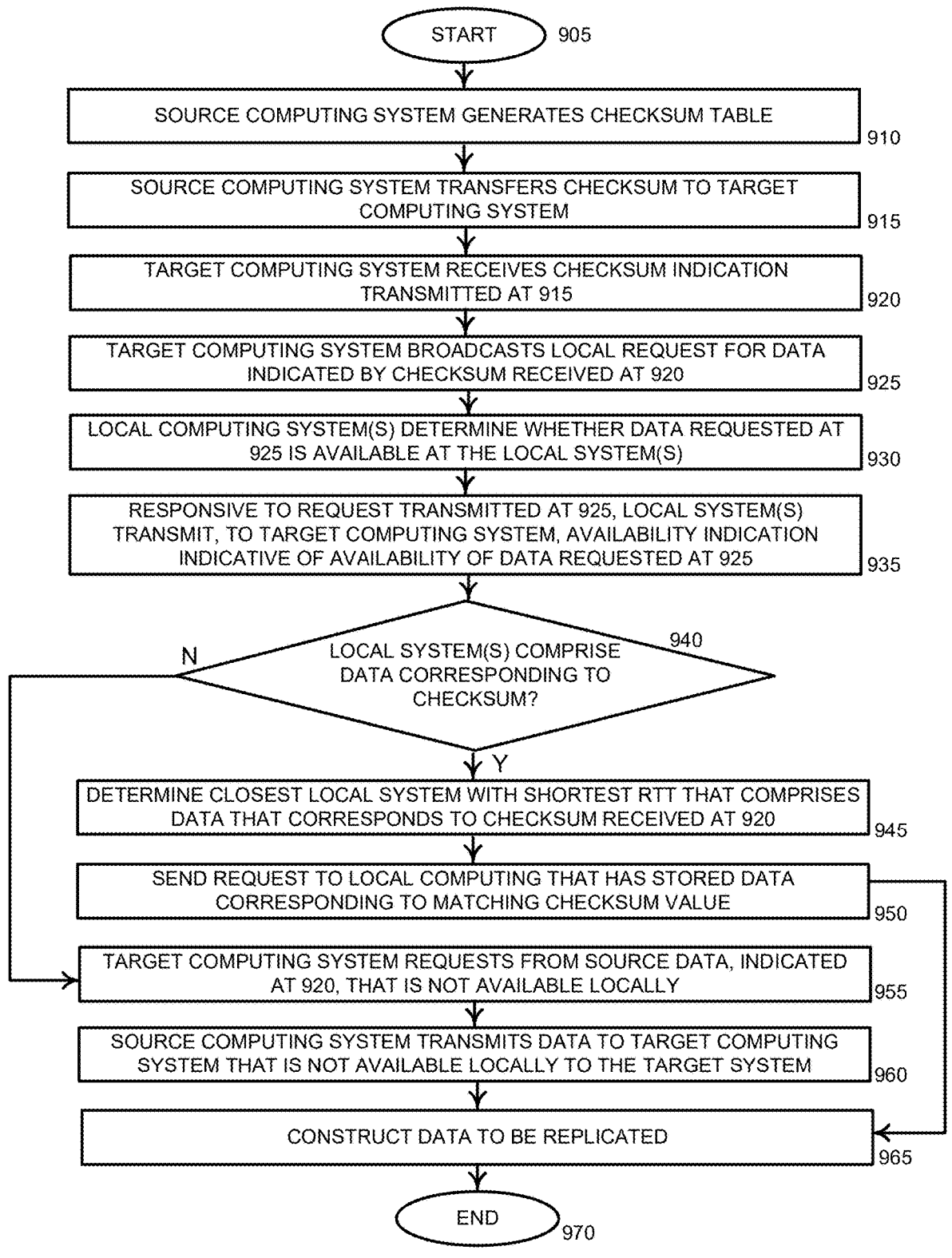

START — 905

SOURCE COMPUTING SYSTEM GENERATES CHECKSUM TABLE — 910

SOURCE COMPUTING SYSTEM TRANSFERS CHECKSUM TO TARGET COMPUTING SYSTEM — 915

TARGET COMPUTING SYSTEM RECEIVES CHECKSUM INDICATION TRANSMITTED AT 915 — 920

TARGET COMPUTING SYSTEM BROADCASTS LOCAL REQUEST FOR DATA INDICATED BY CHECKSUM RECEIVED AT 920 — 925

LOCAL COMPUTING SYSTEM(S) DETERMINE WHETHER DATA REQUESTED AT 925 IS AVAILABLE AT THE LOCAL SYSTEM(S) — 930

RESPONSIVE TO REQUEST TRANSMITTED AT 925, LOCAL SYSTEM(S) TRANSMIT, TO TARGET COMPUTING SYSTEM, AVAILABILITY INDICATION INDICATIVE OF AVAILABILITY OF DATA REQUESTED AT 925 — 935

LOCAL SYSTEM(S) COMPRISE DATA CORRESPONDING TO CHECKSUM? — 940
N
Y

DETERMINE CLOSEST LOCAL SYSTEM WITH SHORTEST RTT THAT COMPRISES DATA THAT CORRESPONDS TO CHECKSUM RECEIVED AT 920 — 945

SEND REQUEST TO LOCAL COMPUTING THAT HAS STORED DATA CORRESPONDING TO MATCHING CHECKSUM VALUE — 950

TARGET COMPUTING SYSTEM REQUESTS FROM SOURCE DATA, INDICATED AT 920, THAT IS NOT AVAILABLE LOCALLY — 955

SOURCE COMPUTING SYSTEM TRANSMITS DATA TO TARGET COMPUTING SYSTEM THAT IS NOT AVAILABLE LOCALLY TO THE TARGET SYSTEM — 960

CONSTRUCT DATA TO BE REPLICATED — 965

END — 970

Figure 11:
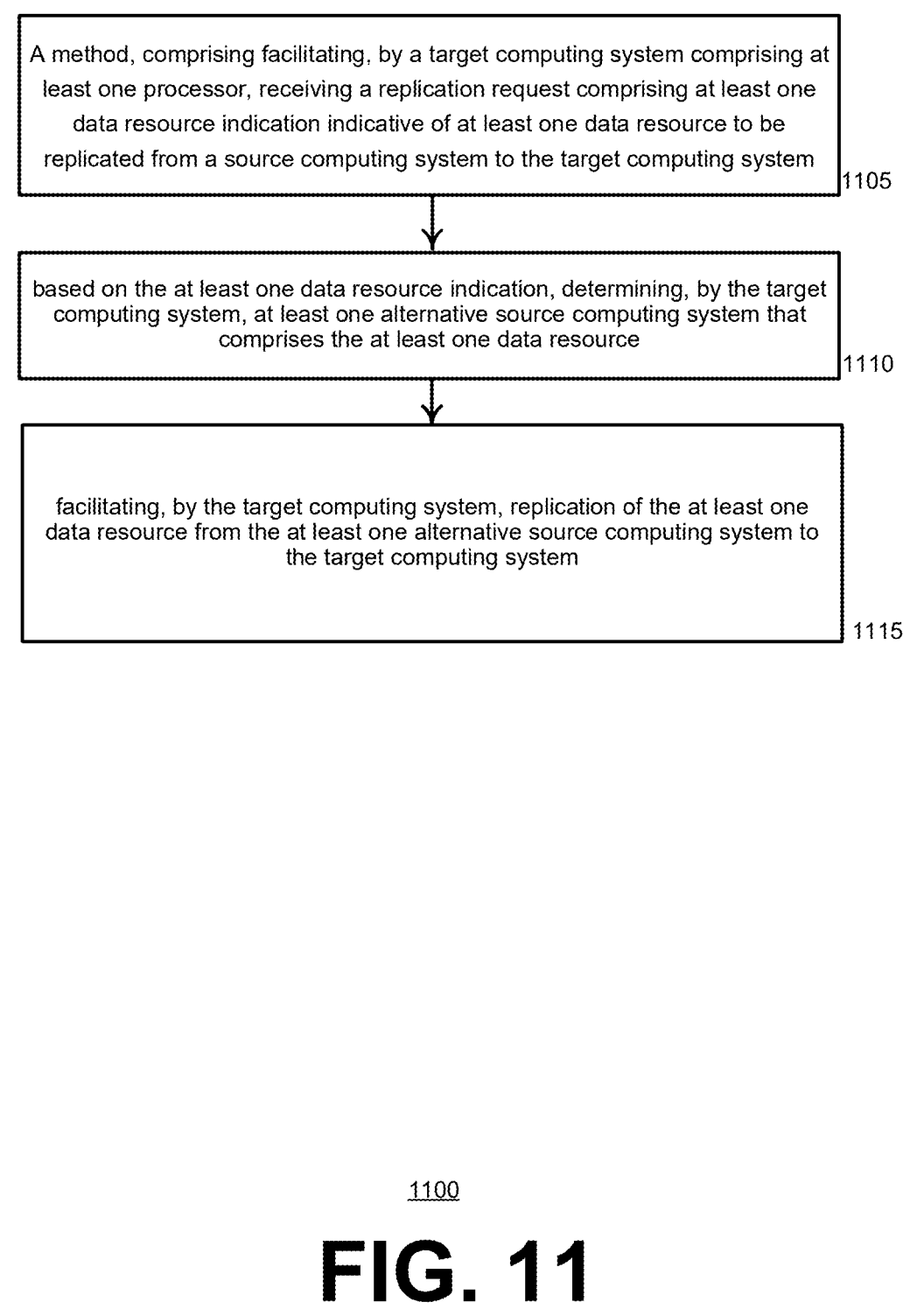

A method, comprising facilitating, by a target computing system comprising at least one processor, receiving a replication request comprising at least one data resource indication indicative of at least one data resource to be replicated from a source computing system to the target computing system

1105 based on the at least one data resource indication, determining, by the target computing system, at least one alternative source computing system that comprises the at least one data resource

1110 facilitating, by the target computing system, replication of the at least one data resource from the at least one alternative source computing system to the target computing system

Figure 12:
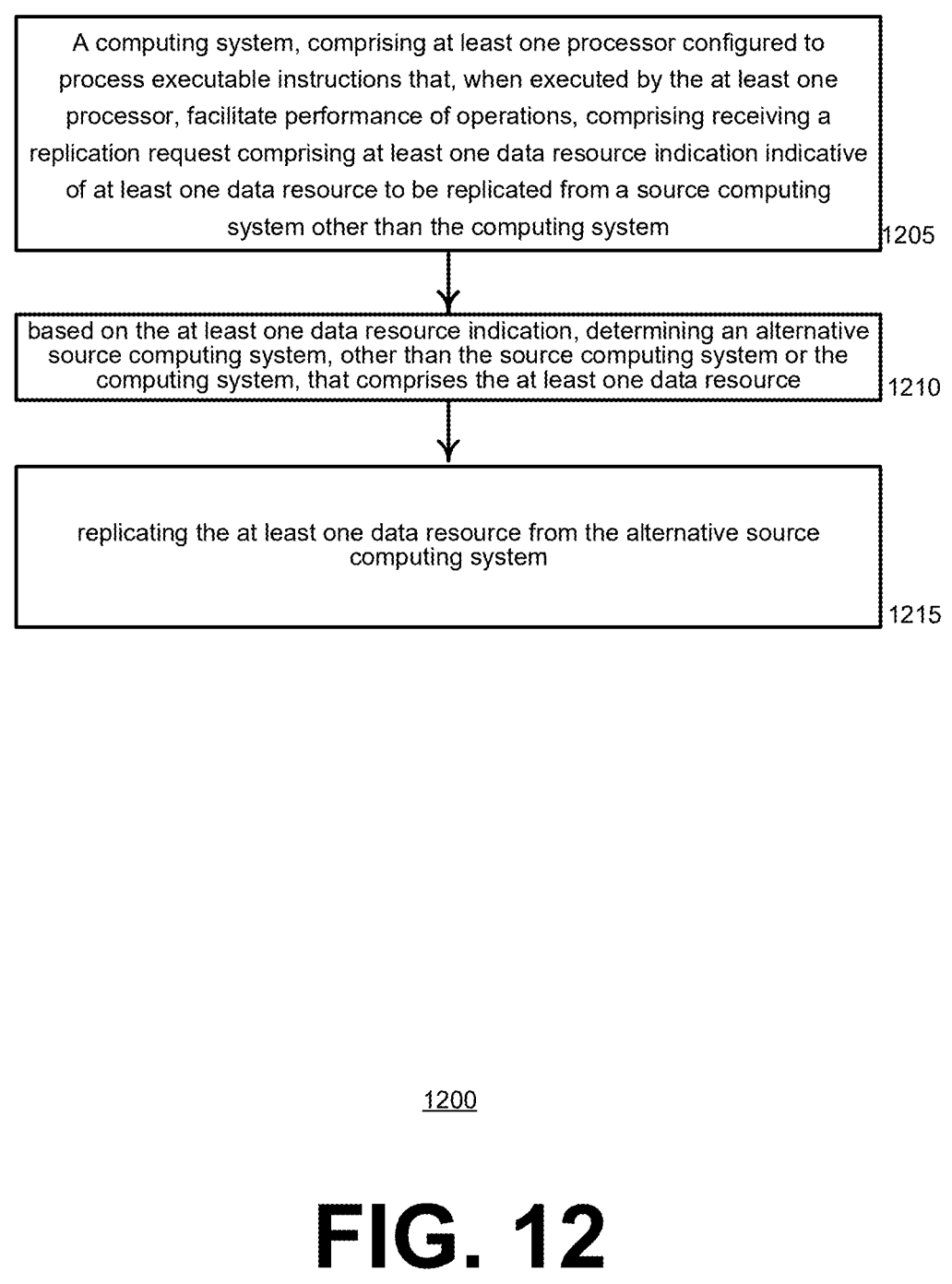

A computing system, comprising at least one processor configured to process executable instructions that, when executed by the at least one processor, facilitate performance of operations, comprising receiving a replication request comprising at least one data resource indication indicative of at least one data resource to be replicated from a source computing system other than the computing system

1205 based on the at least one data resource indication, determining an alternative source computing system, other than the source computing system or the computing system, that comprises the at least one data resource

1210 replicating the at least one data resource from the alternative source computing system

Figure 13:
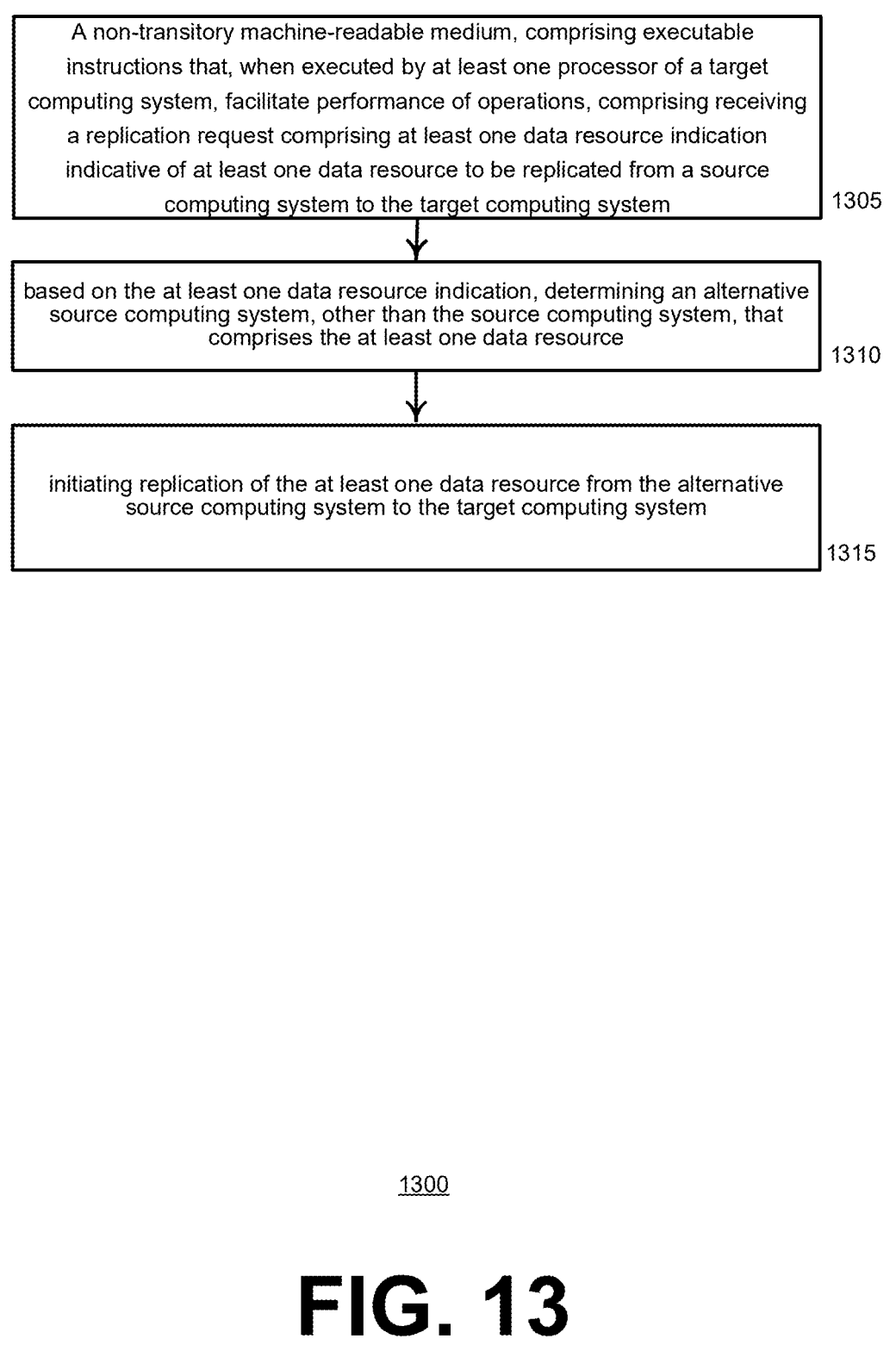

A non-transitory machine-readable medium, comprising executable instructions that, when executed by at least one processor of a target computing system, facilitate performance of operations, comprising receiving a replication request comprising at least one data resource indication indicative of at least one data resource to be replicated from a source computing system to the target computing system

1305 based on the at least one data resource indication, determining an alternative source computing system, other than the source computing system, that comprises the at least one data resource

1310 initiating replication of the at least one data resource from the alternative source computing system to the target computing system

DATA REPLICATION FROM AN ALTERNATIVE SOURCE COMPUTING SYSTEM

BACKGROUND

According to conventional techniques, data stored by a computing system may be replicated from a source computing system to a target computing system without considering whether the data, including a data set or a data structure, may have already been replicated to the target system or may already be available for replication to the target system from a computing storage system that is near to the target computing system.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a target computing system comprising at least one processor, receiving a replication request comprising at least one data resource indication indicative of at least one data resource to be replicated from a source computing system to the target computing system. Based on the at least one data resource indication, the method may further comprise determining, by the target computing system, at least one alternative source computing system that comprises the at least one data resource. The method may further comprise facilitating, by the target computing system, replication of the at least one data resource from the at least one alternative source computing system to the target computing system.

In an example embodiment, the method may further comprise generating, by the target computing system, at least one computing resource table, corresponding to the target computing system, comprising at least one table data resource indication being associated with the at least one alternative source computing system.

In an example embodiment, the at least one table data resource indication may comprise at least one updated table data resource indication corresponding to the at least one data resource to be replicated. The method may further comprise facilitating, by the target computing system, receiving an updated version of the at least one data resource; and updating, by the target computing system, the at least one computing resource table to result in the at least one computing resource table comprising the at least one updated table data resource indication.

The determining that the at least one alternative source computing system comprises the at least one data resource may comprise determining that the at least one data resource indication matches the at least one updated table data resource indication. The at least one data resource may comprise comprises at least one storage unit, wherein the target computing system comprises at least one server computing system, and wherein the at least one computing resource table comprises a master computing resource table that comprises the at least one updated table data resource indication corresponding to the at least one server computing system.

In an example embodiment, the at least one alternative source computing system may be one of the at least one server computing system. The method further comprise, according to metadata associated, via the master computing resource table, with the at least one alternative source computing system, facilitating, by the target computing system, transmitting, to the at least one alternative source computing system, at least one alternative replication request comprising the at least one data resource indication indicative of the at least one data resource to be replicated from the at least one alternative source computing system to the target computing system.

In an example embodiment, the source computing system and the target computing system may not be geographically collocated. The metadata, according to which the at least one alternative replication request is transmitted, may comprise at least one alternative source computing resource identifier corresponding to the at least one alternative source computing system. The at least one alternative source computing system may be geographically collocated with respect to the target computing system.

In an example embodiment, the metadata, according to which the at least one alternative replication request is transmitted, may comprise at least one alternative source computing resource identifier corresponding to the at least one alternative source computing system. The at least one alternative source computing system may not be geographically collocated with respect to the target computing system. The at least one alternative source computing system may be geographically located within a configured geographic range of the target computing system.

In an example embodiment, the at least one alternative source computing system may be geographically located beyond a configured geographic range of the target computing system. The method may further comprise determining, by the target computing system, that replication of the at least one data resource from the at least one alternative source computing system corresponds to an alternative source replication quality-of-service, that replication of the at least one data resource from the source computing system corresponds to a source replication quality-of-service, and that the alternative source replication quality-of-service exceeds the source replication quality-of-service.

In an example embodiment, the facilitating of the replication of the at least one data resource from the at least one alternative source computing system to the target computing system may comprise facilitating, by the target computing system, broadcasting, to at least one neighboring computing system that is located within a configured neighbor range of the target computing system, at least one alternative replication request comprising the at least one data resource indication indicative of the at least one data resource to be replicated from the at least one alternative source computing system to the target computing system.

The configured neighbor range may correspond to at least one of: a data center that comprises the target computing system and the at least one neighboring computing system, a geographic range with respect to a geographic location of the target computing system, a configured node count criterion corresponding to a number of network nodes between the target computing system and the at least one neighboring computing system, or at least one estimated transmission time criterion being satisfied based on at least one determined network performance metric corresponding to the at least one neighboring computing system and the target computing system.

A data resource may comprise a file, a folder, a directory, a volume, or the like.

In another example embodiment, a computing system may comprise at least one processor configured to process executable instructions that, when executed by the at least one processor, facilitate performance of operations, that may comprise receiving a replication request comprising at least one data resource indication indicative of at least one data resource to be replicated from a source computing system other than the computing system. Based on the at least one data resource indication, the operations may further comprise determining an alternative source computing system, other than the source computing system or the computing system, that comprises the at least one data resource. The operations may further comprise replicating the at least one data resource from the alternative source computing system. The computing system may comprise a target computing system to which the at least one data resource is replicated. The target computing system and the alternative source computing system may be geographically collocated with a data center.

In an example embodiment, the operations may further comprise analyzing the at least one data resource indication with respect to a master computing resource table corresponding to the data center to result in at least one analyzed data resource indication. The master computing resource table may comprise the at least one analyzed data resource indication corresponding to the alternative source computing system.

In an example embodiment, the master computing resource table may comprise alternative metadata, corresponding to the at least one data resource, associated with the at least one analyzed data resource indication. The replicating of the at least one data resource from the alternative source computing system may comprise unicasting, according to the alternative metadata, an alternative replication request comprising the at least one data resource indication indicative of the at least one data resource to be replicated from the alternative source computing system to the target computing system.

In yet another example embodiment, a non-transitory machine-readable medium may comprise executable instructions that, when executed by at least one processor of a target computing system, may facilitate performance of operations that may comprise receiving a replication request comprising at least one data resource indication indicative of at least one data resource to be replicated from a source computing system to the target computing system. Based on the at least one data resource indication, the operations may further comprise determining an alternative source computing system, other than the source computing system, that comprises the at least one data resource. The operations may further comprise initiating replication of the at least one data resource from the alternative source computing system to the target computing system.

In an example embodiment, the initiating of the replication of the at least one data resource from the alternative source computing system to the target computing system may comprise analyzing computing system information, corresponding to at least one computing system other than the target computing system or the source computing system, with respect to at least one replication criterion to result in at least one analyzed alternative source computing system. Based on at least one of the at least one analyzed alternative source computing system being determined to satisfy the at least one replication criterion, the operations may further comprise determining at least one determined alternative source computing system. The operations may further comprise transmitting, to the at least one determined alternative source computing system, at least one alternative replication request, comprising the at least one data resource indication, requesting replication of the at least one data resource from the at least one determined alternative source computing system to the target computing system being requested. Responsive to the at least one alternative replication request, the operations may further comprise receiving, from at least one of the at least one determined alternative source computing system, at least one alternative source data resource acknowledgment indicative that the at least one of the at least one determined alternative source computing system comprises at least one of the at least one data resource. Responsive to receiving the at least one alternative source data resource acknowledgment, the operations may further comprise initiating the replicating, from the at least one of the at least one determined alternative source computing system, of the at least one of the at least one data resource.

In an example embodiment, the at least one replication criterion may comprise at least one of: a data center identifier associated with a data center that comprises the target computing system, a geographic range with respect to a geographic location of the target computing system, a configured node count corresponding to a number of network nodes between the target computing system and the alternative source computing system, or at least one estimated transmission time to replicate the at least one data resource from the alternative source computing system or the source computing system.

BRIEF DESCRIPTION OF THE DRAWINGS

FIG. 3 illustrates an example source computing system resource table, corresponding to data stored by a source computing system, comprising at least one data resource indication.

FIG. 4 illustrates an example local target computing system computing resource table.

FIG. 5 illustrates an example master computing resource table.

FIG. 9 illustrates a flow diagram of an example method of data replication from at least one alternative source computing system via broadcast messaging.

FIG. 11 illustrates a block diagram of an example method embodiment.

FIG. 12 illustrates a block diagram of an example computing system.

FIG. 13 illustrates a block diagram of an example non-transitory machine-readable medium embodiment.

DETAILED DESCRIPTION OF THE DRAWINGS

Figure 1:
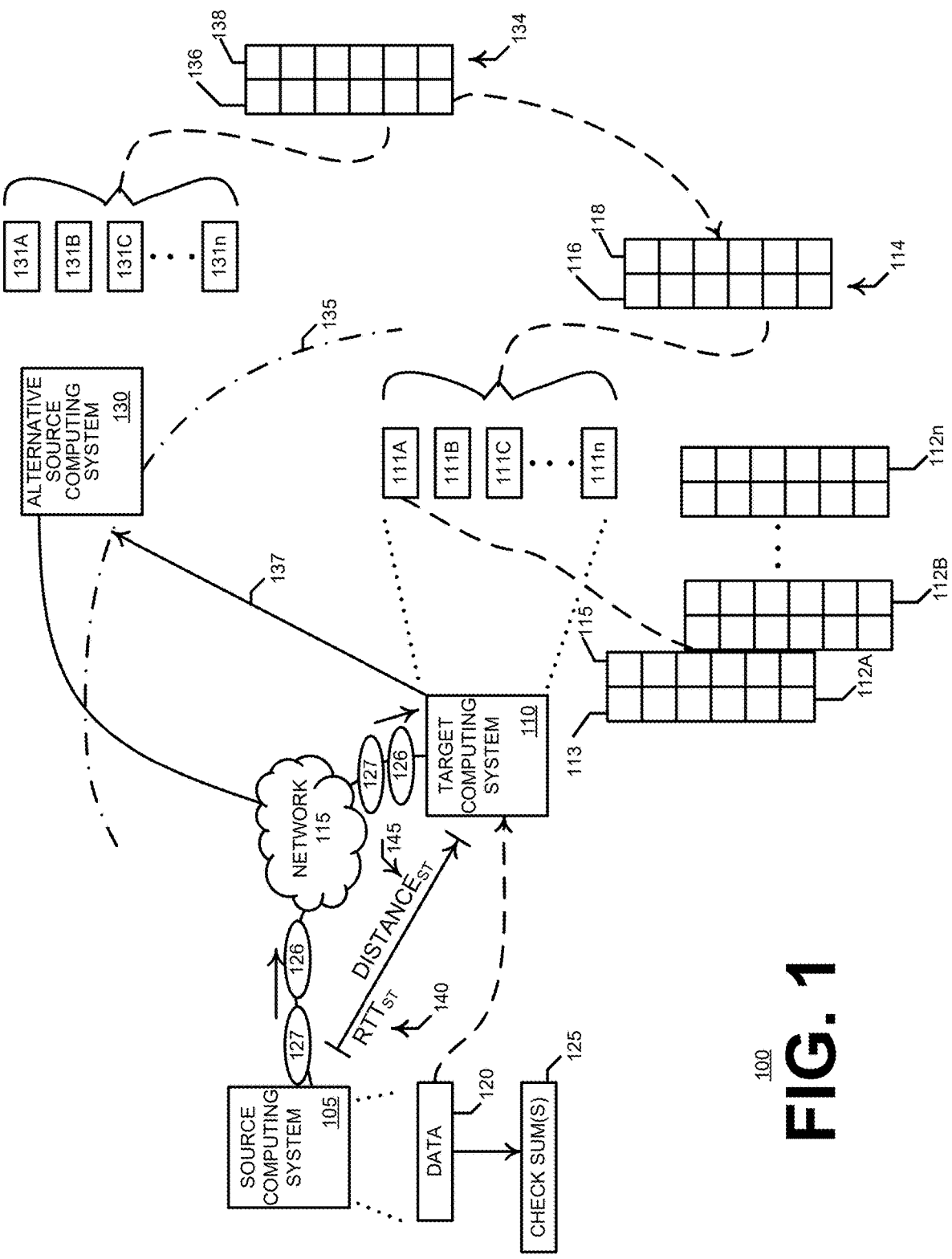
FIG. 1 illustrates a computer networking environment.

As a preliminary matter, it will be readily understood by those persons skilled in the art that the present embodiments are susceptible of broad utility and application. Many methods, embodiments, and adaptations of the present application other than those herein described as well as many variations, modifications, and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

According to example embodiments disclosed herein, a file being replicated from a source computing storage system, which may be referred to as an original source computing storage system, to a target computing storage system may be available at a computing storage system that is different from the target computing storage system wherein the system, other than the source system, that may comprise the file to be replicated may be near to the target storage system, for example, a file to be replicated may be available at a computing storage system that is collocated in a data center that comprises the target computing storage system. Thus, according to embodiments disclosed herein, the target computing system may determine to replicate a file to be replicated from the collocated computing storage system, which may be referred to as an alternative source computing system, instead of from the original source computing system, which may be geographically remote from the data center that may comprise the target system and the alternative source system. Replicating from the alternative source computing system instead of from the original source computing system may reduce use of network bandwidth needed to replicate the file from the remotely located original source computing system, which may be located many miles/kilometers from the data center that comprises the target and alternative source systems and with respect to which the file to be replicated may be routed through multiple network processing points to achieve replication from the original source computing system to the target computing system. Accordingly, if available, replication from a local alternative source computing system instead of from an original source system may result in improved replication performance due to a trip time, for example a roundtrip time, between the alternative source computing system and the target computing system being less than a trip time between the original source computing system and the target computing system. To facilitate replication of at least part of a file to be replicated from a local alternative source computing system instead of from an original source computing system, the target computing system may identify at least portions of the data to be replicated, which portions may be referred to as data 'chunks' and may avoid transmission of data chunks from the original source computing system that many be stored locally, or closer, with respect to the target computing system, as compared to the original source computing system, that may be identical to data chunks available for replication from the alternative computing storage system.

'Roundtrip time' may refer to a time to replicate a data portion, or 'chunk', of data from one computing system to another computing system and may comprise time for the data portion to be delivered from a source computing system to a target computing system and may include time to request replication of the data portion. 'Data chunk' may refer to a fixed-size, a variable size, or a configurable size block of data used to store information corresponding to a file or other storage unit (e.g., 128 MB). 'Checksum' may refer to a unique identifier that may result from applying a hash process (e.g., SHA-256 or MD5 hash) to contents of a data chunk. 'Offset' may refer to a position, such as a start address', of a data chunk within a file that may facilitate locating the chunk/portion of data. 'Length' may refer to a length, or size, of a data chunk with respect to an offset corresponding to the chunk/portion. 'File Path' may refer to a logical location of a file containing a data chunk, and may comprise, for example, a drive indication, a volume indication, a folder indication, and the like. 'Server details' may refer to details corresponding to geographic or logical location, or co-location, of a computing system server with respect to a target computing system. 'Index hash table' may refer to a data structure, for example a hash table or a database, that comprises information corresponding to data chunks, including checksum information, file path information, offset information, or length information.

According to embodiments disclosed herein, computing network bandwidth usage may be managed and optimized to reduce roundtrip time related to replicating data to a target computing storage system by identifying data-chunks corresponding to data to be replicated that may be available near (e.g., geographically or logically) to a target computing storage system to which the data to be replicated is to be replicated. Large files may be divided into smaller chunks (fixed-size, variable-size or configurable-size blocks of data) and compared to chunks available near the target computing storage system to facilitate replicating at least some of the chucks from the closer computing storage system to a target system, which may result in reducing long-distance traversal of the at least some data chunks and thus improve performance of replicating the data to be replicated to the target computing storage system by avoiding transferring data that is near to the target storage system from an original source computing system than may be farther away from the target system than an alternative source computing system that may comprise the at least some of the data chunks to be replicated.

According to example embodiments disclosed herein, a computing system may segment data stored thereby into chunks and generate a chunk checksum table comprising checksum values that may correspond to, and that may be uniquely indicative of, the respective data chunks/segments/portions. Data may be segmented by dividing data stored by the original source computing system into one or more into fixed size chunks, variable size chunks, or configurable size chunks, (e.g., 128 MB). Chunk sizes can be configurable with respect to file size, type, or other user-defined parameters. The computing system may skip, or avoid, dividing sparse (e.g., empty or null regions of a storage component) into chunks to avoid or reduce processing/transferring of data that may be unnecessary or not useful. For each chunk, the original source system may generate a checksum and add the checksum to a checksum table. An original source computing system or a potential target computing system may generate checksum tables that may facilitate at least one embodiment disclosed herein.

According to at least one embodiment disclosed herein, a potential target computing system may generate or maintain a master checksum index (e.g., hash) table, with respect to a co-location site (e.g., data center), comprising chunk information and associated metadata for data that is present at the co-location site. The master checksum/hash index table may comprise information indicative of each chunk and indicative of metadata corresponding to the chunk(s). Metadata may comprise information such as, for example, server, location/file path, offset and length within the file. Use of a master checksum master table may facilitate the original source computing system avoiding transmitting of chunks that may be available locally with respect to a target system and that are indicated as being available by the master checksum index (hash) table. The target computing system may obtain at least one chunk locally in response to a unicast request message that is sent to at least one local alternative computing system based on information indicated by the master table.

According to at least one embodiment, at a co-location site (e.g., at a data center that comprises a target computing system server and at least one other computing system server), at least one local checksum index (hash) table corresponding to at least one server corresponding to the co-location site may be maintained that indicate(s), for at least one data chunk, at least one unique checksum value, and metadata associated therewith, corresponding to the at least one other computing system. The local checksum index hash table may comprise at least one record for each chunk metadata such as, for example, location/file path, offset and length within the file, and the at least one unique checksum value, etc. The target computing storage system may initiate a broadcast request to all computing storage server corresponding to the co-location site/data center that comprises a request for available data that are to be replicated to the target computing system. Responsive to the broadcast request message, at least one collocated server, which may be referred to as an at least one potential alternative source computing system/server, may respond to the target computing storage server with chunk metadata, indicative of data chunks available based on the at least one potential alternative system comparing at least one checksum indicated in the request to at least one checksum value indicated in a local checksum table respectively corresponding to the at least one potential alternative source system. The target computing system may then instruct at least one of the at least one potential alternative source computing system a request to retrieve/replicate at least one of the available chunks from the respective potential alternative source storage system(s)/server(s), which may be geographically near to the target storage system, if not actually located at the same data center as the target computing system, which may reduce time and network bandwidth usage in replicating data by avoiding long distance travel of at least one data chunk from the original source computing storage system to the target computing system.

According to at least one example embodiment, a source computing system may generate, or update, a checksum table that may comprise information indicative of data to be replicated at a target computing system. The source computing system may transfer at least one checksum value corresponding to at least one data chunk, along with metadata corresponding to the at least one data chunk, to a target computing storage system. The target computing storage system may receive the chunk checksum value(s) sent from source computing storage system/server. The target computing storage system may look up, in a local checksum/hash table, the received checksum. The target computing storage system may determine that received checksum values do not match checksum values corresponding to data chunks that may be stored by the target computing system. The target computing system may request transfer from the source computing system to the target computing system data chunks, and associated metadata, corresponding to the non-matching checksums. The target system may write received chunk data to a file to be replicated at the target computing system. The target computing system may update a co-location master checksum index hash table with metadata and checksum values corresponding to received/replicated data chunks that may be useful to facilitate future replication actions. For checksum/hash values that are indicated by a local table, such as a master table or a local server table, as matching a checksum values corresponding to data to be replicated to the target computing system, the target computing system may identify data chucks indicated by the table as being located locally with respect to the target computing system and the target system may request that at least one local alternative computing system send the locally located data chunk(s) to the target system. Responsive to the request, the target computing storage system may copy, or receive, from at least one alternative source computing system, the identified data chunk(s) according to metadata corresponding to the chunk(s) (e.g., according to file path, offset and length, etc. corresponding to checksum value(s) associated with the data chunk(s)).

In an example embodiment, a source computing storage system/server may generate and populate a checksum table that may comprise checksum values corresponding to data chunks to be replicated to a target computing storage system. The source computing storage system may transfer at least one of the chunk checksum values with associated metadata to the target computing storage system. Responsive to receiving the checksum values from the source computing storage system/server, the target computing storage system may broadcast received checksum value(s), corresponding to data chunks that are not already available at the target system, to storage servers/system co-located with the target system, a request to look up in local tables, corresponding to the co-located servers, to determine whether data chunks indicated in the request by the checksum values are available at the local co-located servers. The collocated servers/systems may transmit to the target system availability information, which may comprise checksum values corresponding to the data chunks, that may be indicative of the availability of data chunk(s) at the co-located systems/servers. The target storage system may analyze at least one nearby (e.g., nearer to the target system than the original source computing system with respect to geographic distance, logical distance, or number of network nodes along a path or route from the collocated server to the target system) to determine whether the nearby system comprises at least one data chunk not available at the target system. The target system may request that a nearby server that comprises a data chunk not available at the target system send the data chunk to the target computing storage system/server.

The target computing storage system, after receiving indication of availability of data chunk(s) and corresponding checksum value(s) from servers that may be co-located with respect to the target system, may indicate to the original source computing storage system/server the unavailability of the data chunks and may request, from the original source computing system, that the original source system transmit to the target system chunk data corresponding to checksum and meta data corresponding to data chunk(s) that is/are unavailable at a nearby alternative source computing system. Responsive to the request for data chunks unavailable from nearby alternative source computing systems, the original source computing system may transmit to the target system data chunk(s) that is/are unavailable locally, or nearby, to the target computing system. Checksum values corresponding to data chunks transmitted by the original source computing system may accompany the data chunks transmitted to the target system. The target computing storage system may write received chunk data to a file, or files, to which the data chunk(s) correspond. The target system may cause the updating of a co-location system index hash table, corresponding to the target computing system, with metadata corresponding to received data chunks for potential future use for future copy/replication actions. Upon successful chunk transfer, the original source computing storage system may update an index checksum/hash table. The target system may construct a file to be replicated using, for example, an offset received from the source system/cluster to locate and copy, or refer, at least one data chunk locally. The target system may construct a file by combining chunks received from the original source computing system and chunks received from local collocated servers, which may be referred to as alternative source computing systems.

Figure 2:
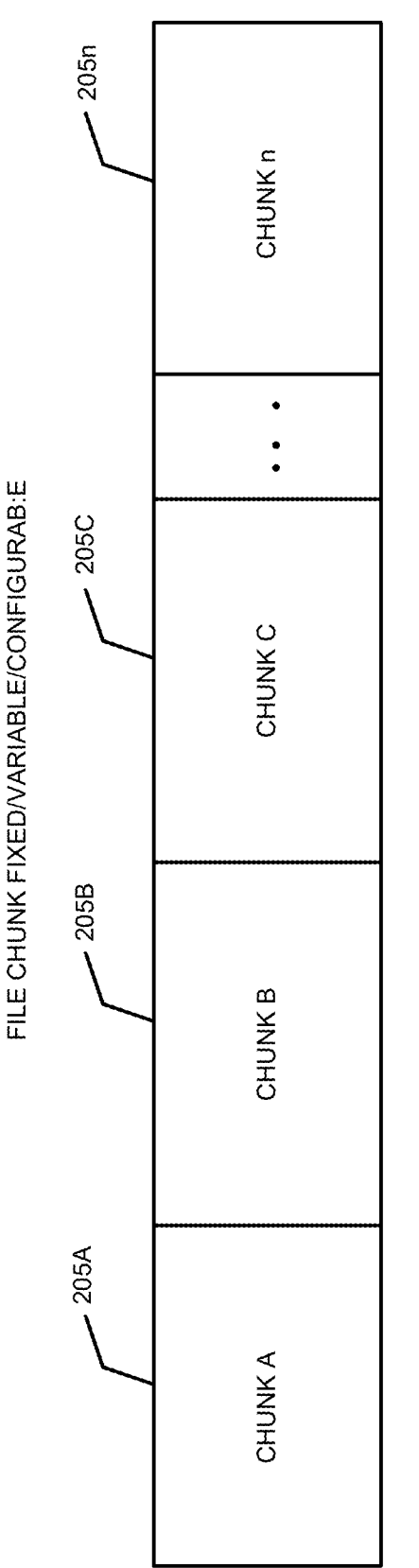
FIG. 2 illustrates example data portions stored by a source computing system.
Figure 6:
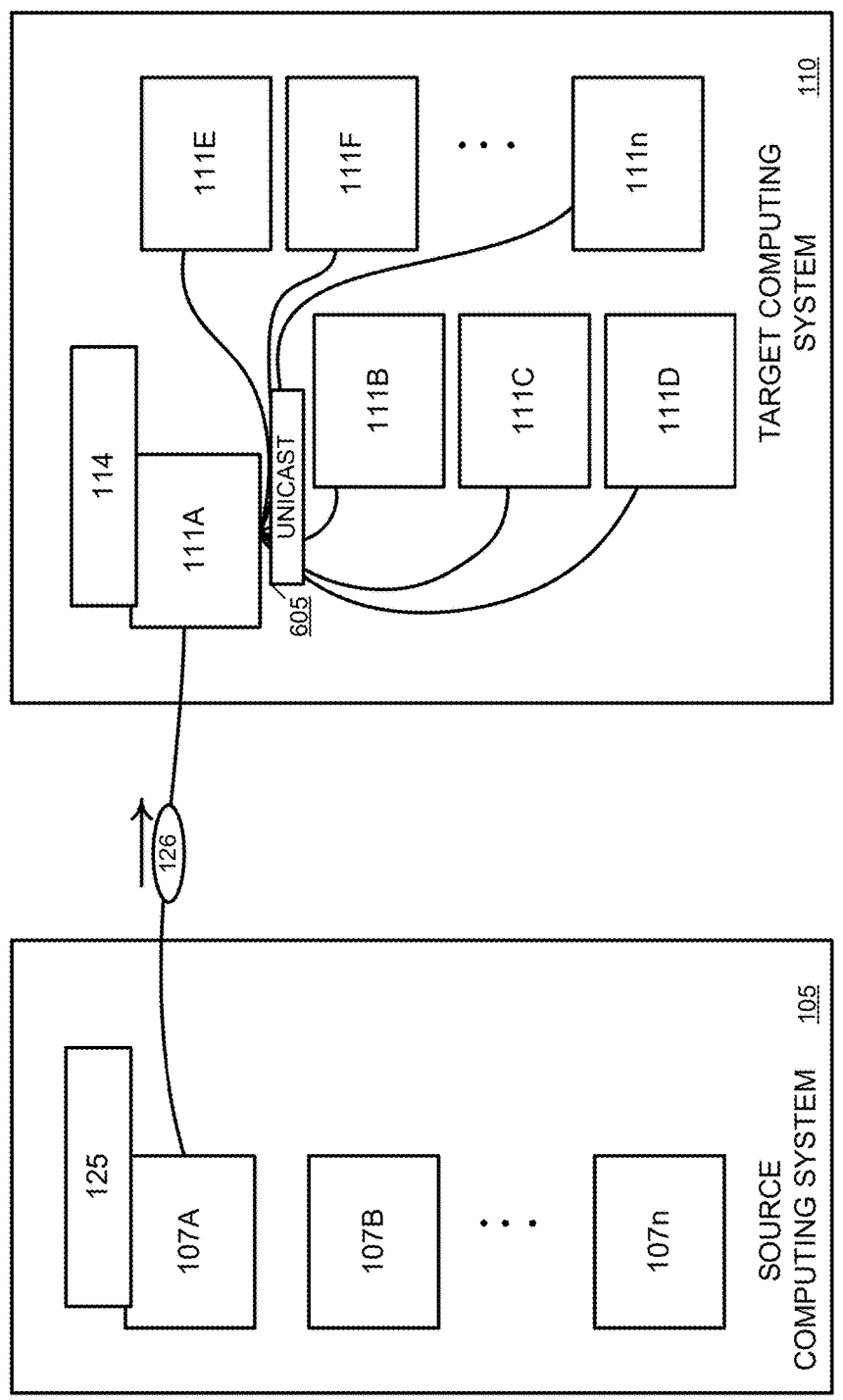
FIG. 6 illustrates an example embodiment to request data replication from at least one alternative source computing system via unicast messaging.

Turning now to FIG. 1, the figure illustrates a computing system environment 100. Source computing system 105, which may be referred to as an original source computing system, may comprise data 120 to be replicated to target computing system 110. To facilitate replicating of data 120 to target computing system 110, source computing system 105 may generate table 125 corresponding to data stored by at least one server corresponding to source computing system 105. Table 125 may comprise an indication 126 indicative of data to be replicated from source computing system 105 to target computing system 110, or to a computing server corresponding thereto. For example, as shown in FIG. 2, data 120 may comprise multiple portions 205, or 'chunks', of data, for example, data stored by one or more storage blocks of a storage component such as a disk drive, solid-state drive, tape drive, or other similar storage component. Continuing with description of FIG. 1, Table 125 may comprise at least one indication 126 indicative of at least one data portion/chunk 205 to be replicated at target computing system 110. Source computing system 105 may transmit, to target computing system 110, at least one indication 126 indicative of data 120, or at least one chunk/portion thereof, to be replicated at the target computing system. At least one indication 126 may comprise at least one checksum, at least one hash value, or at least one other unique identifier indicative of at least one corresponding data chunk/portion 205.

In an example embodiment, target computing system 110 may comprise, or may generate, at least one local table 112 that may correspond to at least one local computing system/ server 111A-111n and that may comprise, for example, at least one checksum 113, at least one hash, or at least one other unique indication indicative of data that may be stored in data portions, or chunks, by at least one local computing system 111A-111n. At least one table 112 may comprise metadata 115 respectively associated with data portion identifiers 113 that may be indicative of a location where at least one data portion to be replicated is stored by at least one local computing system 111A-111n to which the at least one table 112 may correspond. After receiving a request 127, transmitted by source computing system 105, to replicate at least one portion of data 120 stored by the source computing system indicated by indication 126, target computing system 110 may determine whether at least one indication 126, indicative of at least one data portion 120, may match at least one identifier 113 stored by at least one table 112. Based on evaluation, by target computing system 110, of at least one indication 126 received from source computing system 105, resulting in a determination that at least one computing system 111A-111n comprises at least one data chunk to be replicated from source computing system 105, the target computing system may determine whether a time, for example a roundtrip time, corresponding to retrieval or replication of the at least one data chunk indicated by indication 126 may be less than, or equal to, roundtrip time 140 corresponding to a time to replicate data from source computing system 105 to target computing system 110. If target computing system 110 determines that data indicated by indication 126 may be stored locally by at least one computing system 111A-111n and may be retrieved there from in less time than time 140, the target computing system may replicate the data from a locally stored version instead of replicating the same data from source computing system 105. It will be appreciated that the data to be replicated may be replicated from at least one computing system 111 to a different computing system 111, or from one computing system 111 to the same computing system 111.

In another example embodiment, target computing system 110 may comprise a master table 114 that may comprise, for example, at least one checksum 116, or other indication, that may be indicative of at least one portion of data stored by more than one of, or all of, computing system(s) 111A-111n. Table 114 may comprise metadata 118, respectively associated with checksums 116, that may be indicative of path information, or other indication of location of data corresponding to indications 116, indicative of at least one location where at least one data chunk corresponding to indication 126 may be stored by at least one computing system 111A-111n.

In an example embodiment, master table 114 may comprise at least one checksum 116 and associated metadata 118 that may correspond to at least one alternative source computing system 130 that may be geographically located remotely with respect to target computing system 110. Table 114 may be indicative of at least one computing system 131A-131n that may correspond to alternative source computing system 130. At least one metadata field 118 indicated by table 114 may indicate, may point to, or may otherwise correspond to at least one local table corresponding to at least one computing system of computing systems 131A-131n. In an example embodiment, master table 114 may indicate, or may otherwise correspond to, at least one alternative master table 134 corresponding to alternative source computing system 130. Alternative master table 134 may comprise at least one checksum 136, hash value, or other indication, associated with metadata information 138 that may be indicative of at least one computing system 131A-131n that may comprise at least one portion of data to be replicated to target computing system as indicated by indication 126. Target computing system 110 may determine whether a roundtrip time corresponding to replicating data from at least one computing system 131A-131n may be shorter than/less than round trip time 140 corresponding to replicating at least one portion of data 120, indicated by indication 126, from source computing system 105.

In an example embodiment, target computing system 110 may determine whether alternative source computing system 130 may lie within a geographic range 135 corresponding to geographic radius 137 with respect to target computing system 110. Target competing system 110 may determine to replicate at least one portion of data 120 indicated by indication 126 from at least one computing system 131A-131n corresponding to alternative source computing system 130 if radius 137 satisfies a geographic distance criterion, for example target computing system 110 may determine to replicate data from alternative source computing system 130 instead of from competing system 105 if radius 137 is less than or equal to distance 145 from source computing system 105 to target computing system 110. At least one portion of data 120 indicated by indication 126 may be replicated from the alternative source computing system 130 to the target computing system if a distance criterion is determined to be satisfied.

Turning now to FIG. 3, the figure illustrates an example table 125 described in reference to FIG. 1. Source computing system 105 may generate table 125 that may comprise at least one file path information indication in column 305 and at least one unique indication 310 corresponding to at least one data portion indicated in respective field 305. Information indicated in column 305 may be referred to as metadata. Information indicated in column 310 may comprise at least one checksum, one hash value, or one other unique value indicative of a respective data portion that may be used to store a file indicated in respective field 305. Column 315 may comprise file size information corresponding to at least one file indicated in respective field 305. Information indicated in column 315 may be referred to as metadata. Column 320 may comprise other metadata corresponding to at least one file indicated in respective field 305. In an example, a file indicated in field 305B shown in FIG. 3, may be stored by at least three chunks 205 shown in FIG. 2. Unique checksums, or unique hash values, for example, indicated in field 310B may represent and respectively correspond to the three chunks 205 used to store the file at source computing system 105 indicated by field 305B in table 125. Accordingly, indication 126, shown in FIG. 1, may comprise at least one checksum, hash value, or other unique value, indicated by field 310B shown in FIG. 3, corresponding to the at least one data chunk 205 used to store the file indicated by field 305B at source system 105.

Turning now to FIG. 4, the figure illustrates an example local table 112 described in reference to FIG. 1. Target computing system 105, or at least one computing system/ server 111 corresponding thereto, may generate local table 112, which may comprise in column 410 information indicative of at least one file that may be stored locally at at least one computing system 111 corresponding to the at least one local table 112. In at least one field 113A-113F in column 113, local table 112 may comprise at least one unique identifier, for example a checksum or hash value, indicative of at least one data portion, for example a data chunk 205 described in reference to FIG. 2 that may be used to store a file indicated in a respective field 410. Local table 112 may comprise at least one offset value in column 415 or at least one length value in column 420. The at least one offset value 415 or the at least one length value 420 may correspond to, or may be indicative of, a location of a file indicated in column 410 with respect to which the offset and length values are associated. File information indicated in column 410 may be referred to as metadata (e.g., metadata 115 shown in FIG. 1). Offset values 415 and length values 420 may be referred to as metadata. Local table 112 may comprise other metadata information 425 that may be indicative of at least one file indicated in column 410. Target computing system 110 may comprise more than one individual computing system/server 111 with respect to which table(s) may correspond. Target computing system 110 may comprise, may store, may receive, or may otherwise have access to, at least one table 112 corresponding to at least one computing server 111 which may be collocated with the target computing system.

Figure 7:
FIG. 7 illustrates an example embodiment to request data replication from at least one alternative source computing system via broadcast messaging

In an example, target computing system 110 may comprise at least one of at least one computing server 111. After receiving a replication request 127 requesting replication of at least one data portion indicated by indication 126 as illustrated by FIG. 1, target computing system 110 may transmit, for example via broadcast, to at least one computing system 111 at least one replication request 705 as shown in FIG. 7. Request 705 may comprise a fetch, copy, or other similar command indicative of a request to replicate a data portion corresponding to the at least one checksum value, indicated by indication 126, that may match a checksum value indicated in column 113.

As an example, indication 126 illustrated in FIG. 1 may comprise an indication of at least one checksum indicated by at least one field 310 shown in FIG. 3. Target computing system 110 may evaluate indication 126 and may broadcast request 705 to at least one computing system 111. At least one computing system 111, for example system 111A, may determine that a corresponding table, for example, local table 112A, may comprise in field 113F a checksum that matches the checksum indicated by request 705 that may have been indicated to target computing system 111 via indication 126. In the example, local computing system 111A may determine at least one portion of data corresponding to the checksum indicated in field 113F and corresponding to a file indicated in field 410F. Computing system 111A may acknowledge to target computing system 110 that computing system 111A may replicate at least one data portion requested via request 705 to target computing system 110.

Responsive to the replication request broadcast by target computing system 110 to local computing server 111A, local computing server 111A may transmit to the target computing system at least one data portion corresponding to the checksum indicated in local table 112A by field 113F. Accordingly, instead of replicating at least one data portion indicated by indication 126 received from source computing system 105, target computing system may replicate the at least one data portion indicated by indication 126 from local computing system 111A based on the at least one data portion indicated by indication 126 being stored locally by computing system 111A and based on the checksum value indicated in field 113F by local computing system 111A matching the at least one data portion indicated by indication 126, thus potentially reducing replication time of the at least one data portion that may be indicated by indication 126.

Turning now to FIG. 5, the figure illustrates an example master table 114 described in reference to FIG. 1. Target computing system 110, or a computing system/server corresponding thereto, may generate master table 114, which may comprise in column 515 information indicative of at least one file that may be stored locally by at least one computing system 111 corresponding to the master table. In at least one field 116A-116N in column 116, master table 114 may comprise at least one unique identifier, for example at least one checksum or hash value, indicative of at least one data portion, for example at least one data chunk 205 described in reference to FIG. 2, that may be used to store at least one file, indicated by at least one field 515A-515N, that is associated with the at least checksum, or other unique value. Master table 114 may comprise at least one offset value in column 520 or at least one length value in column 525. The at least one offset 520 or length 525 may correspond to, or may be indicative of, at least one location of at least one file indicated in at least one field 515A-515N with respect to which the offset and length values are associated. Master table 114 may comprise in at least one field 530A-530N at least one roundtrip time value indicative of at least one round trip time, which may be measured round trip time or estimated, to replicate a data portion indicated by at least one respective field 116A-116N from a computing system 111A-111n, shown in FIG. 1, corresponding to a computing system identifier, respectively indicated by at least one field 510A-510N, that is respectively associated with the at least one round trip time value indicated in the at least one field 530A-530N. File information indicated in column 515 may be referred to as metadata. Offset values 520 and length values 525 may be referred to as metadata. Round trip time values 530 may be referred to as metadata. Target computing system 110 may comprise more than one individual computing system/server 111 with respect to which master table 114 may correspond. Target computing system 110 may comprise, may store, may receive, or may otherwise have access to, at least one table 114 corresponding to at least one computing server 111 which may be collocated with the target computing system. In an example embodiment, target computing system 110 may be at least one of at least one computing server 111. After receiving a replication request 127 requesting replication of at least one data portion indicated by indication 126 as illustrated by FIG. 1, target computing system 110 may determine, based on at least one round trip time indicated in column 530 corresponding to at least one checksum value indicated in at least one field 116A-116N that matches information indicated by indication 126 and with respect to which the a least one round trip time value is associated, to request replication of data corresponding to the at least one checksum indicated in at least one field 116A-116N from at least one computing system 111 indicated in at least one filed 510A-510N corresponding to the round trip time value and the at least one field 116A-116N.

Based on determining a round trip time in column 530 being less than a round trip time to replicate data, corresponding to a checksum indicated in column 116 and corresponding to the round trip time indication in column 530, from source computing system 105 (e.g., if RTT 40 ms indicated in field 530D is determined to be less than RTT 140), target computing system 110 may transmit a replication request message 605 to at least one computing system 111, for example via unicast, according to metadata indicated by table 114 that is associated with at least one checksum value indicated in column 116. Request 605 may comprise a fetch, copy, or other similar command indicative of of a request to replicate a data portion corresponding to the at least one checksum indicated in column 116 that may match a checksum value corresponding to a data portion to be replicated as indicated by indication 126 received from source computing system 105.

As an example, indication 126 illustrated in FIG. 1, may comprise an indication of at least one checksum indicated by at least one field 310 shown in FIG. 3. Target computing system 110 may evaluate indication 126 and may determine that master table 114 may indicate that a checksum in field 116E, associated with a computing system identifier in column 510E, which may be indicative of computing system 111A, matches the checksum received from source computing system 105 via indication 126. Computing system 110 may unicast a replication request 605 to local computing system 111A to replicate at least one portion of data, corresponding to the checksum indicated in field 116E and corresponding to a file indicated in field 515E, at least the data portion corresponding to the checksum, or other unique identifier, indicated by field 116E. Replication request 605 transmitted by the target computing system 110 to local computing system 111A may also comprise metadata indicated in at least one of field 520E, 525E, or 525E. Responsive to replication request 605 unicast by target computing system 110 to local computing server 111A, local computing server 111A may transmit to the target computing system at least one data portion corresponding to the checksum indicated in master table 114 by field 116E. Accordingly, instead of replicating from source computing system 105 at least one data portion indicated by indication 126 received from the source computing system, target computing system 110 may replicate the at least one data portion indicated by indication 126 from local computing system 111A based on the at least one data portion indicated by indication 126 being determined to be stored locally by computing system 111A based on the checksum value indicated in field 116E being determined to match the at least one data portion indicated by indication 126, thus potentially reducing replication time of the at least one data portion that may be indicated by indication 126.

In an example embodiment, master table 114 may not only comprise information corresponding to local computing systems 111, but master table also 114 may comprise information corresponding to remotely located computing systems 131 corresponding to alternative source computing system 130. Information included in master table 114 may comprise information included in a master table 134 that corresponds to remotely located computing systems 131, which may be geographically located remotely with respect to target computing system 110 but which may be geographically located locally with respect to alternative source computing system 130. Master table 114 may comprise round trip times in column 530 respectively corresponding to round trip times to replicate data from at least one computing system 131. Entries shown in bold font (e.g., rows B, D, G, and K) may indicate a storage server/computing system indicated in column 510 with a minimum round trip time accessibility that may facilitate choosing a fastest reachable server when having to reach a storage server with matching checksum wherein data corresponding to the same checksum are available from multiple local computing system servers 111 or 131 shown in FIG. 1

Figure 8:
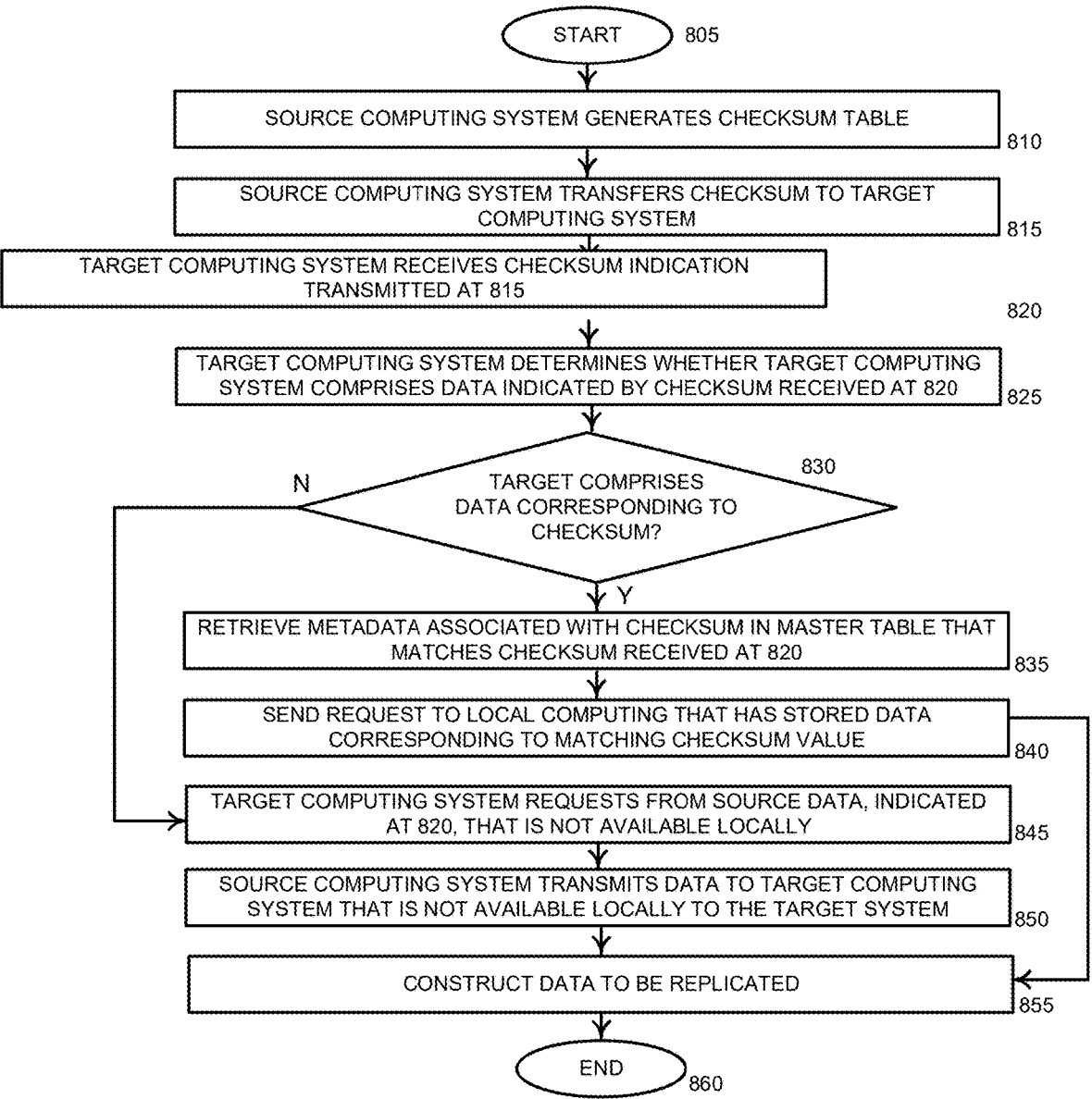
FIG. 8 illustrates a flow diagram of an example method of data replication from at least one alternative source computing system via unicast messaging.

Turning now to FIG. 8, the figure illustrates a flow diagram of an example embodiment method 800 to request, by a target computing system, replication of data via a unicast messaging from at least one computing system geographically located locally with respect to the target computing system. Method 800 begins at act 805. At act 810, a source computing system may generate a checksum table, for example table 125 illustrated in FIG. 2. The checksum table generated at act 810 may comprise at least one checksum value, or at least one hash value, that corresponds to a data portion, or a data chunk, that may be used by the source computing system to store a portion of data. At act 815, the source computing system may transmit, or transfer, to a target computing system at least one checksum from the checksum table generated at act 810. The at least one checksum transmitted at act 815 may be indicative of at least one portion of data to be replicated and stored at the target computing system. At act 820, the target computing system may receive the indication of at least one checksum transmitted by the source computing system at act 815. At act 825, the target computing system may determine from at least one master table corresponding to the target computing system, for example by performing a table lookup, whether the target computing system may comprise the same data portion corresponding to the at least one checksum value or hash value received at act 810. At act 830, if a determination is made that a portion of data corresponding to the checksum received at act 820 is stored by at least one computing system that is geographically located locally with respect to the target computing system (e.g., the target computing system may determine whether the master table comprises a checksum value that matches a checksum value received at act 820), method 800 may advance to act 835. At act 835, the target computing system may retrieve, from the at least one master table, metadata associated with the at least one checksum in the master table that matches the at least one check some value received from the source computing system at act 820. At act 840, the target computing system may send to a computing system corresponding to the target computing system a request for the at least one data portion corresponding to the at least one checksum value received at act 820 according to metadata retrieved at act 835. The request sent at act 840 may be sent to the computing system corresponding to the metadata determined at act 835 via unicast messaging. At act 855, the target computing system may receive data requested at act 840, and construct, reconstruct, or replicate the at least one data portion indicated by the check some value received at act 820. Method 800 may, after constructing data to be replicated at act 855, advance to act 860 and end.

Returning to the description of act 830, if the target computing system determines that a computing system that is geographically located locally with respect to the target computing system or at least located geographically closer to the target computing system than the source computing system does not comprise data corresponding to the checksum value received at act 820, the target computing system may, at act 845, send a request to the source computing system requesting data indicated by the request received at act 820 that cannot be replicated from either a computing system located locally with respect to the target computing system or at least from a computing system that is located geographically closer to the target computing system then the source computing system, or that corresponds to a shorter roundtrip time to replicate the data than if the data to be replicated were replicated from the source computing system. Responsive to the request sent to the source computing system at act 845, at act 850 the target computing system may receive from the source computing system data portions that may have been indicated at act 820 but that are not available locally with respect to the target computing system. At act 855, the target computing system may construct, or replicate, data indicated at act 820 using data received at act 850 responsive to the request transmitted at act 845. If some, but not all, data requested at act 820 is locally available to the target computing system, the target computing system may construct, or replicate, data requested at act 820 partially using data received from the source computing system at act 850 and partially using data that may have been received locally from a computing system that is either geographically located locally with respect to the target computing system or that may correspond to a shorter round trip time to obtain data that if the data were requested and received from the source computing system. Method 800 may advance from act 855 to act 860 and end.

Turning now to FIG. 9, the figure illustrates an example embodiment method 900 to replicate data for at least one computing system corresponding to a target computing system. Method 900 begins at act 905. At act 910, a source computing system may generate at least one checksum table, for example table 125 illustrated in FIG. 2. The checksum table generated at act 910 may comprise at least one check some value, or at least one hash value, that corresponds to a data portion, or a data chunk, that may be used to store a portion of data by the source computing system. At act 915, the source computing system may transmit, or transfer, to a target computing system at least one checksum from the checksum table generated at act 910. The at least one checksum transmitted at act 915 may be indicative of at least one portion of data to be replicated and stored at the target computing system. At act 920, the target computing system may receive the indication of at least one checksum transmitted by the source computing system at act 915.

At act 925, the target computing system may broadcast a local request to at least one computing system that is located geographically locally with respect to the target computing system, or that may be located within a configured geographic range or that may correspond to a configured round trip time criterion, to communicate data to the target computing system. The local request transmitted at act 925 may comprise at least one of the at least one checksum received at act 920 from the source computing system. At act 930, at least one local computing system, for example, a computing system 111 or 131 illustrated in FIG. 1, may determine whether the at least one computing system may have stored a data portion corresponding to a checksum value, or hash value, that matches the at least one checksum received at act 920. Responsive to the request transmitted at act 925, at act 935 at least one of the at least one local computing system may transmit to the target computing system an acknowledgement message indicative that the at least one local competing system is capable of making available at least one data portion corresponding to a checksum value indicated in the local request broadcast at act 925.

At act 940, the target computing system may determine whether at least one of the at least one local, or nearby, computing system may comprise at least one data portion indicated by the at least one checksum value that may have been broadcast by the target computing system at act 925. If the target computing system determines, based on at least one acknowledgment message transmitted at act 935 by at least one local computing system and that may be received by the target computing system, that at least one local computing system comprises at least one data portion corresponding to at least one of the at least one check some values broadcast, method 900 may advance to act 945. At act 945, the target computing system may determine at least one nearby local computing system that may comprise at least one data portion corresponding to at least one checksum value that matches at least one checksum value indicated in the request broadcast at 925. The target computing system may determine the at least one nearby local computing system based on at least one location of the at least one nearby local computing system satisfying a distance criterion, for example, the at least one nearby local computing system being geographically closer to the target computing system than the source computing system. The target computing system may determine the at least one nearby local computing system based on at least one round trip time corresponding to the at least one nearby local computing system satisfying a time criterion, for example, a time to replicate data from the at least one nearby local computing system being less than a time to replicate date from the source computing system to the target computing system. At act 950, the target computing system may send, to at least one of the at least one computing system determined at act 945, at least one request for the at least one data portion corresponding to the at least one checksum value received at act 920 according to information that may be receive from the at least one local computing system at act 935. At act 965, the target computing system may receive data requested at act 950, and may construct, reconstruct, or replicate the at least one data portion indicated by the check some value received at act 920. Method 900 may, after the target computing system, at act 965, constructs/reconstructs/replicates data to be replicated, advance to act 970 and end.

Returning to the description of act 940, if the target computing system determines that a computing system that is geographically located locally, or nearby, with respect to the target computing system, or is at least located geographically closer to the target computing system than the source computing system, does not comprise data corresponding to the checksum value received at act 920, the target computing system may, at act 955, send a request to the source computing system requesting data indicated by the request received at act 920 that cannot be replicated from either a computing system located locally with respect to the target computing system or at least from a computing system that is located geographically closer to the target computing system then the source computing system, or that corresponds to a shorter roundtrip time to replicate the data then if the data to be replicated were replicated from the source computing system. Responsive to the request sent to the source computing system at act 955, at act 960 the target computing system may receive from the source computing system data portions that may have been indicated at act 920 but that have not been acknowledged as being available locally with respect to the target computing system. At act 965, the target computing system may construct, or replicate, data indicated at act 920 using data received at act 960. If some data, but not all data, requested at act 920 is available/nearby with respect to the target computing system the target computing system may construct, or replicate, data requested at act 920 partially using data received from the source computing system at act 960 and partially using data that may have been received locally from a computing system that is either geographically located locally/nearby with respect to the target computing system or that may correspond to a shorter round trip time to obtain data that if the data were requested and received from the source computing system. Method 900 may advance from act 965 to act 970 and end.

Turning now to FIG. 11, the figure illustrates an example embodiment method 1100 comprising at block 1105 facilitating, by a target computing system comprising at least one processor, receiving a replication request comprising at least one data resource indication indicative of at least one data resource to be replicated from a source computing system to the target computing system; at block 1110 based on the at least one data resource indication, determining, by the target computing system, at least one alternative source computing system that comprises the at least one data resource; and at block 1115 facilitating, by the target computing system, replication of the at least one data resource from the at least one alternative source computing system to the target computing system.

Turning now to FIG. 12, the figure illustrates a computing system, comprising at block 1205 at least one processor configured to process executable instructions that, when executed by the at least one processor, facilitate performance of operations, comprising receiving a replication request comprising at least one data resource indication indicative of at least one data resource to be replicated from a source computing system other than the computing system; at block 1210 based on the at least one data resource indication, determining an alternative source computing system, other than the source computing system or the computing system, that comprises the at least one data resource; and at block 1215 replicating the at least one data resource from the alternative source computing system.

Turning now to FIG. 13, the figure illustrates a non-transitory machine-readable medium 1300 comprising at block 1305 executable instructions that, when executed by at least one processor of a target computing system, facilitate performance of operations, comprising receiving a replication request comprising at least one data resource indication indicative of at least one data resource to be replicated from a source computing system to the target computing system; at block 1310 based on the at least one data resource indication, determining an alternative source computing system, other than the source computing system, that comprises the at least one data resource; and at block 1315 initiating replication of the at least one data resource from the alternative source computing system to the target computing system.

Figure 10:
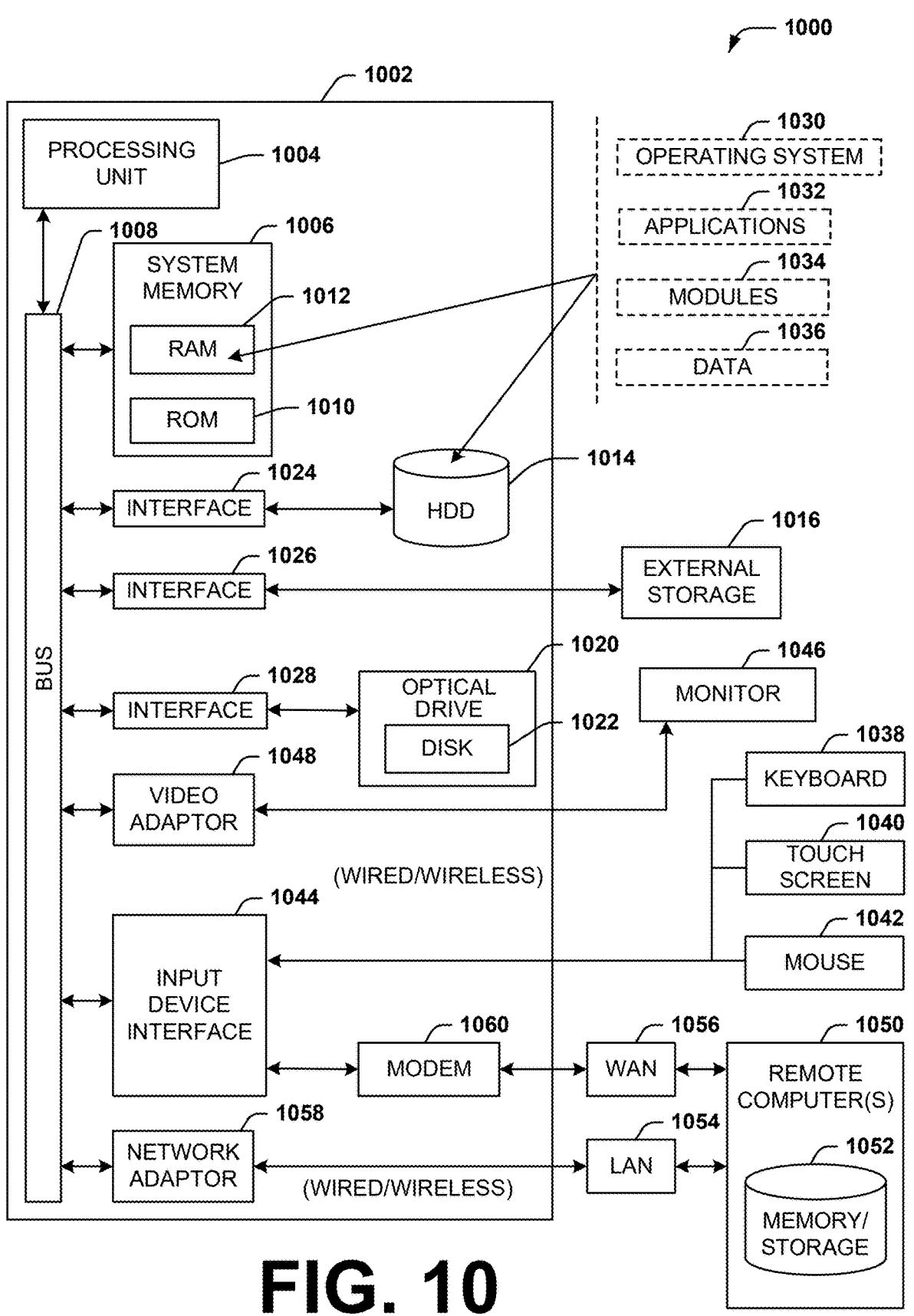
FIG. 10 illustrates an example computer environment.

In order to provide additional context for various embodiments described herein, FIG. 10 and the following discussion are intended to provide a brief, general description of a suitable computing environment 1000 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS)

can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

Computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1010. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/ storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes,"

"has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a target computing system comprising at least one processor, receiving a replication request comprising at least one data resource indication indicative of at least one data resource to be replicated from a source computing system to the target computing system;

based on the at least one data resource indication, determining, by the target computing system, at least one alternative source computing system that comprises the at least one data resource; and facilitating, by the target computing system, replication of the at least one data resource from the at least one alternative source computing system to the target computing system, wherein the replication comprises broadcasting, to at least one neighboring computing system that is located within a configured neighbor range of the target computing system, at least one alternative replication request comprising the at least one data resource indication indicative of the at least one data resource to be replicated from the at least one alternative source computing system to the target computing system.

2. The method of claim 1, further comprising:

generating, by the target computing system, at least one computing resource table, corresponding to the target computing system, comprising at least one table data resource indication being associated with the at least one alternative source computing system.

3. The method of claim 2, wherein the at least one table data resource indication comprises at least one updated table data resource indication corresponding to the at least one data resource to be replicated, and wherein the method further comprises:

facilitating, by the target computing system, receiving an updated version of the at least one data resource; and updating, by the target computing system, the at least one computing resource table to result in the at least one computing resource table comprising the at least one updated table data resource indication.

4. The method of claim 3, wherein the determining that the at least one alternative source computing system comprises the at least one data resource comprises:

determining that the at least one data resource indication matches the at least one updated table data resource indication.

5. The method of claim 3, wherein the at least one data resource comprises at least one storage unit, wherein the target computing system comprises at least one server computing system, and wherein the at least one computing resource table comprises a master computing resource table that comprises the at least one updated table data resource indication corresponding to the at least one server computing system.

6. The method of claim 5, wherein the at least one alternative source computing system is one of the at least one server computing system, and wherein the method further comprises:

according to metadata associated, via the master computing resource table, with the at least one alternative source computing system, determining, by the target computing system, the at least one alternative source computing system.

7. The method of claim 6, wherein the source computing system and the target computing system are not geographically collocated, wherein the metadata, according to which the at least one alternative replication request is transmitted, comprises at least one alternative source computing resource identifier corresponding to the at least one alternative source computing system, and wherein the at least one alternative source computing system is geographically collocated with respect to the target computing system.

8. The method of claim 6, wherein the metadata, according to which the at least one alternative replication request is transmitted, comprises at least one alternative source computing resource identifier corresponding to the at least one alternative source computing system, and wherein the at least one alternative source computing system is not geographically collocated with respect to the target computing system.

9. The method of claim 8, wherein the at least one alternative source computing system is geographically located within a configured geographic range of the target computing system.

10. The method of claim 8, wherein the at least one alternative source computing system is geographically located beyond a configured geographic range of the target computing system, and wherein the method further comprises:

determining, by the target computing system, that replication of the at least one data resource from the at least one alternative source computing system corresponds to an alternative source replication quality-of-service, that replication of the at least one data resource from the source computing system corresponds to a source replication quality-of-service, and that the alternative source replication quality-of-service exceeds the source replication quality-of-service.

11. The method of claim 1, wherein the configured neighbor range corresponds to at least one of: a data center that comprises the target computing system and the at least one neighboring computing system, a geographic range with respect to a geographic location of the target computing system, a configured node count criterion corresponding to a number of network nodes between the target computing system and the at least one neighboring computing system, or at least one estimated transmission time criterion being satisfied based on at least one determined network performance metric corresponding to the at least one neighboring computing system and the target computing system.

12. A computing system, comprising at least one processor configured to process executable instructions that, when executed by the at least one processor, facilitate performance of operations, comprising:

receiving a replication request comprising at least one data resource indication indicative of at least one data resource to be replicated from a source computing system other than the computing system;

based on the at least one data resource indication, determining an alternative source computing system, other than the source computing system or the computing system, that comprises the at least one data resource; and replicating the at least one data resource from the alternative source computing system, wherein the replication comprises broadcasting, to at least one neighboring computing system that is located within a configured neighbor range of the target computing system, at least one alternative replication request comprising the at least one data resource indication indicative of the at least one data resource to be replicated from the at least one alternative source computing system to the target computing system.

13. The computing system of claim 12, wherein the computing system comprises a target computing system to which the at least one data resource is to be replicated.

14. The computing system of claim 13, wherein the target computing system and the alternative source computing system are geographically collocated with a data center.

15. The computing system of claim 14, wherein the operations further comprise:

analyzing the at least one data resource indication with respect to a master computing resource table corresponding to the data center to result in at least one analyzed data resource indication, wherein the master computing resource table comprises the at least one analyzed data resource indication corresponding to the alternative source computing system.

16. The computing system of claim 15, wherein the master computing resource table comprises alternative metadata, corresponding to the at least one data resource, associated with the at least one analyzed data resource indication, and wherein the replicating of the at least one data resource from the alternative source computing system comprises unicasting, according to the alternative metadata, an alternative replication request comprising the at least one data resource indication indicative of the at least one data resource to be replicated from the alternative source computing system to the target computing system.

17. A non-transitory machine-readable medium, comprising executable instructions that, when executed by at least one processor of a target computing system, facilitate performance of operations, comprising:

receiving a replication request comprising at least one data resource indication indicative of at least one data resource to be replicated from a source computing system to the target computing system;

based on the at least one data resource indication, determining an alternative source computing system, other than the source computing system, that comprises the at least one data resource; and initiating replication of the at least one data resource from the alternative source computing system to the target computing system, wherein the replication is to comprise transmitting, to at least one neighboring computing system that is located within a configured neighbor range of the target computing system, at least one alternative replication request comprising at least one data resource indication indicative of the at least one data resource to be replicated from the at least one alternative source computing system to the target computing system.

18. The non-transitory machine-readable medium of claim 17, wherein the initiating of the replication of the at least one data resource from the alternative source computing system to the target computing system further comprises:

analyzing computing system information, corresponding to at least one computing system other than the target computing system or the source computing system, with respect to at least one replication criterion to result in at least one analyzed alternative source computing system;

wherein the determining of the at least one determined alternative source computing system is further based on at least one of the at least one analyzed alternative source computing system being determined to satisfy the at least one replication criterion;

responsive to the at least one alternative replication request, receiving, from at least one of the at least one determined alternative source computing system, at least one alternative source data resource acknowledgment indicative that the at least one of the at least one determined alternative source computing system comprises at least one of the at least one data resource; and wherein the initiating the replicating, from the at least one of the at least one determined alternative source computing system, of the at least one of the at least one data resource is responsive to the receiving of the at least one alternative source data resource acknowledgment.

19. The non-transitory machine-readable medium of claim 18, wherein the at least one replication criterion comprises at least one of: a data center identifier associated with a data center that comprises the target computing system, a geographic range with respect to a geographic location of the target computing system, a configured node count corresponding to a number of network nodes between the target computing system and the alternative source computing system, or at least one estimated transmission time to replicate the at least one data resource from the alternative source computing system or the source computing system.

20. The non-transitory machine-readable medium of claim 17, wherein the at least one alternative source computing system is geographically located within a configured geographic range of the target computing system.

* * * * *